United States Patent
Tagashira

(10) Patent No.: US 7,840,817 B2
(45) Date of Patent: Nov. 23, 2010

(54) DATA PROCESSING APPARATUS AND METHOD

(75) Inventor: Nobuhiro Tagashira, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 853 days.

(21) Appl. No.: 11/750,012

(22) Filed: May 17, 2007

(65) Prior Publication Data

US 2008/0046744 A1    Feb. 21, 2008

(30) Foreign Application Priority Data

Jun. 7, 2006    (JP)    ............................. 2006-159144

(51) Int. Cl.
*G06F 21/00*    (2006.01)
(52) U.S. Cl. .................................... 713/186
(58) Field of Classification Search ................. 713/186
See application file for complete search history.

(56) References Cited

U.S. PATENT DOCUMENTS

| | | | |
|---|---|---|---|
| 5,784,464 A | | 7/1998 | Akiyama et al. |
| 6,058,476 A | * | 5/2000 | Matsuzaki et al. .......... 713/169 |
| 7,296,147 B2 | * | 11/2007 | Matsuzaki et al. .......... 713/155 |
| 2002/0031352 A1 | | 3/2002 | Saito |
| 2002/0126844 A1 | * | 9/2002 | Rix et al. .................... 380/211 |
| 2003/0231249 A1 | | 12/2003 | Nakamura |
| 2004/0193874 A1 | * | 9/2004 | Kanazawa et al. .......... 713/161 |
| 2005/0091508 A1 | | 4/2005 | Lee et al. |
| 2005/0259816 A1 | | 11/2005 | Han et al. |

FOREIGN PATENT DOCUMENTS

| | | |
|---|---|---|
| EP | 1 017 223 A2 | 7/2000 |
| EP | 1 526 433 A1 | 4/2005 |
| JP | 10-224343 | 8/1998 |
| JP | 3526521 | 2/2004 |
| KR | 10-2001-0090167 A | 10/2001 |
| KR | 2005-0039523 A | 4/2005 |
| KR | 2005-0045742 A | 5/2005 |
| WO | WO 97/36426 | 10/1997 |

OTHER PUBLICATIONS

The above reference were cited in on Sep. 30, 2008 Korean Office Action that issued in Korean Patent Application 10-2007-0053078.

(Continued)

*Primary Examiner*—Kambiz Zand
*Assistant Examiner*—Teshome Hailu
(74) *Attorney, Agent, or Firm*—Cowan, Liebowitz & Latman, P.C.

(57) ABSTRACT

To realize device authentication which is highly resistant to attacks with simple procedures. Hence, an authentication unit of an image input apparatus transmits first data to an authentication unit of an information holding device, and receives, from the authentication unit, encrypted key information and second data which is generated from the first data. The authentication unit authenticates a partner device based on the first data and second data. In the case that authentication is successful, the authentication unit of the image input apparatus decrypts the encrypted key information to acquire key information. Then the image input apparatus encrypts data using the key information, and transmits the encrypted data to the partner device.

10 Claims, 6 Drawing Sheets

OTHER PUBLICATIONS

Menezes, et al. "Handbook of Applied Cryptography, 10.3.1 Background on Time Variant Parameters" Handbook of Applied Cryptography, CRC Press Series on Discrete Mathematices and its Applications, Boca Raton, FL, CRC Press, US, 1997, pp. 397-405, XP-002440045.

Menezes, et al. "Handbook of applied Cryptography, Passage" Handbook of Applied Cryptography, CRC Press Series on Discrete Mathematices and its Applications, Boca Raton, FL, CRC Press, US, 1997, pp. 551-553, (XP-002435541).

The above reference was cited in a Apr. 30, 2009 Korean Office Action that issued in Korean Patent Application No. 10-2007-0053078, which is enclosed without English Translation.

The above reference was cited in the Office Action issued in a Mar. 27, 2009, concerning the corresponding European Patent Appplication No. 07109736.4.

* cited by examiner

DATA PROCESSING APPARATUS AND METHOD

BACKGROUND OF THE INVENTION

1. Field of the Invention

The present invention relates to authentication and cryptography between equipment connected to each other.

2. Description of the Related Art

These days, image capturing using digital cameras has prevailed. This is because images captured by digital cameras do not deteriorate with time, can be stored and searched easily, and can be transmitted to remote places easily.

With the development of semiconductor processes, the capacity of memory cards for recording image data increases rapidly. Recently, even gigabyte-class memory cards have become popular, and one memory card can record much image data. On the other hand, much image data may leak at once from a lost or stolen memory card. Leakage of much image data poses a serious problem in terms of privacy protection.

As a measure against the leakage of image data, there is proposed a method of encrypting, within a digital camera, images captured by the digital camera, and recording the encrypted image data on a memory card. To make encryption effective, key information necessary for encryption must be managed securely. The following are conceivable methods of managing key information in a digital camera:

(1) a method of managing key information within a digital camera; and (2) a method of inputting key information from outside a digital camera in encryption.

Method (1) will be called an "inner key method", and method (2) will be called an "outer key method".

(1) Inner Key Method

Inner key methods can be classified into two types, "common-key cryptographic model" and "public-key cryptographic model" in accordance with the classification of the cryptographic algorithm.

According to the inner key method of the common-key cryptographic model, only encrypting and decrypting sides hold a common key in secret. If this method assumes the use of encrypted image data by a personal computer (PC), a common key held in a digital camera in secret must be shared with the PC.

The inner key method of the public-key cryptographic model can make an encryption key (public key) and a decryption key (secret key) different from each other, and can lay the encryption key open to the public. The digital camera manages a public key necessary for encryption, and this management is very easy because of the features of the public-key cryptographic model. However, the public-key cryptographic model creates a much heavier processing load than the common-key cryptographic model. The processing ability of the digital camera is poor, and the processing load of the public-key cryptographic model poses a problem.

(2) Outer Key Method

Outer key methods can be classified into two types, "human model" and "device model" in accordance with the entity which manages key information.

According to the outer key method of the human model, the user inputs key information to a digital camera in encryption. To make encryption effective, random key information of at least a predetermined length (e.g., a personal identification number (PIN) of at least a predetermined length) is exploited. However, the digital camera has only a limited user interface including a dial and buttons. Thus, input of key information via the user interface of the digital camera has practical drawbacks.

According to the outer key method of the device model, a device which holds key information is mounted in a digital camera to load key information from the device in encryption. This method has resistance to the destruction attack and the like, like a smart card, and can employ devices with various features for managing key information, and with processing ability.

For example, there is a device called a MOPASS (mobile passport) card. The MOPASS card is an integrated card of a flash memory and smart card, and has the same physical shape as that of the flash memory. The MOPASS card can be used as a device with the same attack resistance as that of the smart card without providing a new physical interface to a digital camera. By using the device with such attack resistance, key information held in the device can be considered secure.

Device Authentication

In terms of a set of a digital camera and device, it is important whether the device mounted in the digital camera holds desired key information. One solution to this is device authentication (or partner authentication) based on the ISO/IEC9798 series. According to device authentication, when a device which holds key information is used by mounting it in a digital camera, the digital camera confirms whether the device is an authentic one holding desired key information, and the device confirms whether the digital camera should receive key information. That is, the digital camera and device authenticate each other.

It is considered that a digital camera is used without being connected to a network in many cases. Hence, authentication cannot utilize a third party. Mutual authentication methods using no third party among authentication methods based on the ISO/IEC9798 series are as follows.

Two-pass Authentication Method (ISO/IEC9798-2) Using Common-Key Cryptographic Model Entities A and B share a secret key K. The entity A transmits message M ($E_K(M)$) encrypted with the secret key K to the entity B. The entity B decrypts encrypted message $E_K(M)$, and verifies the likelihood of the message M to authenticate the entity A. The entity A authenticates the entity B by executing the same procedures inversely.

Three-Pass Authentication Method (ISO/IEC9798-2) Using Common-Key Cryptographic Model Entities A and B share a secret key K. The entity A authenticates the entity B by the challenge-response method. The entity B generates a response using the secret key K and the common-key cryptographic model. The entity B authenticates the entity A by executing the same procedures inversely. When sending back a response from the entity B to the entity A, one pass can be deleted by adding a challenge.

Two-pass Authentication Method (ISO/IEC9798-3) Using Public-Key Cryptographic Model An entity A transmits digital signature-added message M to an entity B. The entity B verifies the digital signature of the message M with the public key of the entity A to authenticate the entity A. The entity A authenticates the entity B by executing the same procedures inversely.

Three-Pass Authentication Method (ISO/IEC9798-3) Using Public-Key Cryptographic Model This method is also based on the same challenge-response method as that of the three-pass authentication method (ISO/IEC9798-2) using the common-key cryptographic model except that a digital signature is used to generate a response.

Two-Pass Authentication Method (ISO/IEC9798-4) Using MAC

This authentication method is the same as the two-pass authentication method (ISO/IEC9798-2) using the common-key cryptographic model except that a MAC (Message Authentication Code) is generated instead of encrypted message $E_K(M)$.

Three-Pass Authentication Method (ISO/IEC9798-4) Using MAC

This authentication method is also based on the same challenge-response method as that of the three-pass authentication method (ISO/IEC9798-2) using the common-key cryptographic model except that the MAC is used to generate a response.

Problems of Digital Camera

The following problems remain unsolved in a method of encrypting an image within a digital camera by a simple combination of the outer key method of the device model with device authentication.

First, device authentication raises a problem. More specifically, authentication (mutual authentication) must be executed twice: a digital camera authenticates a device holding a key, and the device authenticates the digital camera. That is, both the digital camera and device must have the authentication function. As a result, the processing procedures and functional mounting may become redundant.

Second, a digital camera requires a function of receiving key information from the outside. Similar to the first problem, the processing procedures and functional mounting may become complicated.

Problems of Device Authentication

When simply combined with a conventional method, device authentication suffers the following problems.

The two-pass authentication method essentially cannot resist the replay attack. For example, in the two-pass authentication method (ISO/IEC9798-2) using the common-key cryptographic model, an attacker wiretaps a communication path between entities A and B, acquires encrypted message $E_K(M)$, and sends it back to the entity B. This disguises the attacker as the entity A.

The three-pass authentication method takes a long time for three-pass message exchange (procedures) till the completion of device authentication.

SUMMARY OF THE INVENTION

In one aspect, a data processing method transmits first data to a partner device; receives, from the partner device, encrypted key information and second data which is generated from the first data; authenticates the partner device based on the first data and the second data; decrypts, in the case that the authentication is successful, the encrypted key information to acquire key information; and encrypts data using the key information for transmission of the encrypted data to the partner device.

In another aspect, a data processing method receives first data from a partner device; generates second data from the first data; and transmits the second data and encrypted key information to the partner device.

According to the aspect, device authentication, which is highly resistant to attacks with simple procedures, is realized.

Further features of the present invention will become apparent from the following description of exemplary embodiments with reference to the attached drawings.

DESCRIPTION OF THE EMBODIMENTS

Information processing apparatus and method according to the present invention will be described in detail below with reference to the accompanying drawings.

First Embodiment

[Configuration of Authentication System]

Figure 1:
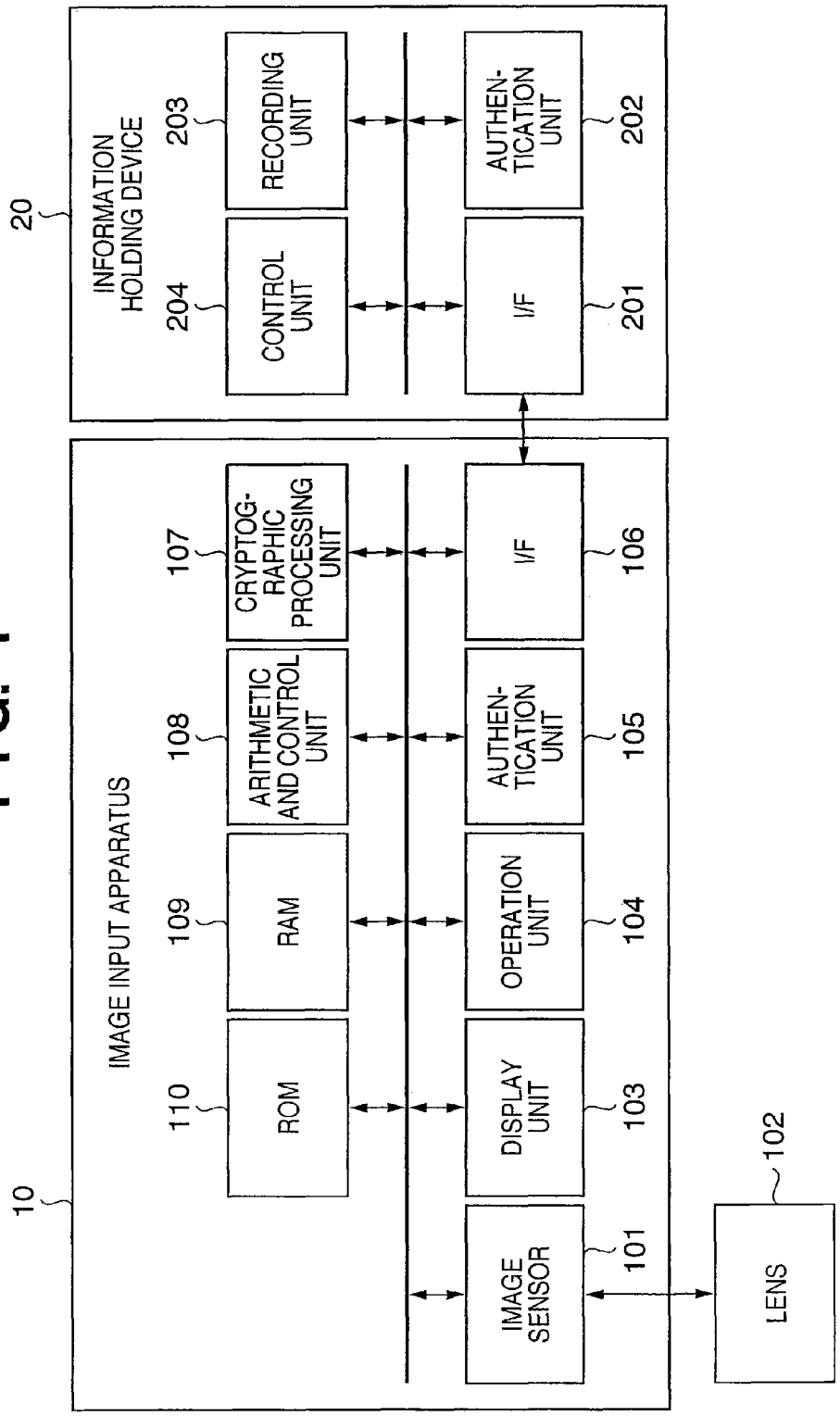
FIG. 1 is a block diagram showing arrangement of an image processing apparatus having a device authentication function.

FIG. 1 is a block diagram showing an arrangement of an image processing apparatus having a device authentication function.

The image processing apparatus comprises an image input apparatus 10 such as a digital camera, and an attack-resistant information holding device 20 such as a smart card. In implementing the image processing apparatus, not all building components shown in FIG. 1 need be used. Images sensed by the image input apparatus 10 are not limited to still images, and also include moving images.

Image Input Apparatus

In the image input apparatus 10, an image sensor 101 such as a CCD or CMOS sensor converts light input via a lens 102 into an electrical signal. A display unit 103 displays image data, and various setting values and statuses of the image input apparatus 10 on a liquid crystal monitor and a plurality of display panels. An operation unit 104 comprises various buttons, setting dials, and the like, and allows the user of the image input apparatus 10 to input various instructions.

An arithmetic and control unit 108 uses a RAM 109 as a work memory, and executes programs stored in a ROM 110 to control respective units of the image input apparatus 10. The arithmetic and control unit 108 converts an electrical signal output from the image sensor 101 into a digital signal, and executes image processing such as encoding of the digital signal and compression, generating image data of the captured image.

Using key information held by an authentication unit 105 as an encryption key, a cryptographic processing unit 107 encrypts image data generated by the arithmetic and control unit 108. The cryptographic algorithm can employ various common-key cryptographic models such as AES (Advanced Encryption Standard).

The authentication unit 105 authenticates the validity of the information holding device 20. When the authentication unit 105 authenticates the information holding device 20, it decrypts encrypted key information received from the information holding device 20, and temporarily holds the decrypted key information, details of which will be described later.

The key information holding period can be set equal to the authentication validity maintenance period. For example, the authentication unit 105 may perform authentication every processing cycle by the cryptographic processing unit 107, hold key information, and after the key information is used, erase it. Alternatively, the authentication unit 105 may perform authentication and hold key information every time the information holding device 20 is connected to (or mounted in) the image input apparatus 10. In this case, the authentication unit 105 may keep holding the key information until the information holding device 20 is disconnected (or dismounted) from the image input apparatus 10. When key information contains information (e.g., checksum or hash value) for verifying integrity, the authentication unit 105 can also verify the integrity of the key information, authenticate the validity of the information holding device 20, and when the integrity of the decrypted key information is verified, temporarily hold the key information.

An interface (I/F) 106 provides an interface with the information holding device 20, and has a physical shape, connector, and the like in conformity with the information holding device 20. If the information holding device 20 is not directly mounted in the image input apparatus 10, the I/F 106 may be a serial bus interface such as USB (universal serial bus) or IEEE1394, or a wired, wireless, or infrared communication interface.

Information Holding Device

A control unit 204 of the information holding device 20 controls a recording unit 203 and I/F 201. The recording unit 203 is a non-volatile memory for holding image data and the like. An authentication unit 202 proves the validity of the information holding device 20 for the image input apparatus 10, details of which will be described later. Also, the authentication unit 202 encrypts its held key information and transmits the encrypted key information to the image input apparatus 10. The I/F 201 is an interface corresponding to the I/F 106 of the image input apparatus 10.

[Arrangement for Device Authentication]

Figure 2:
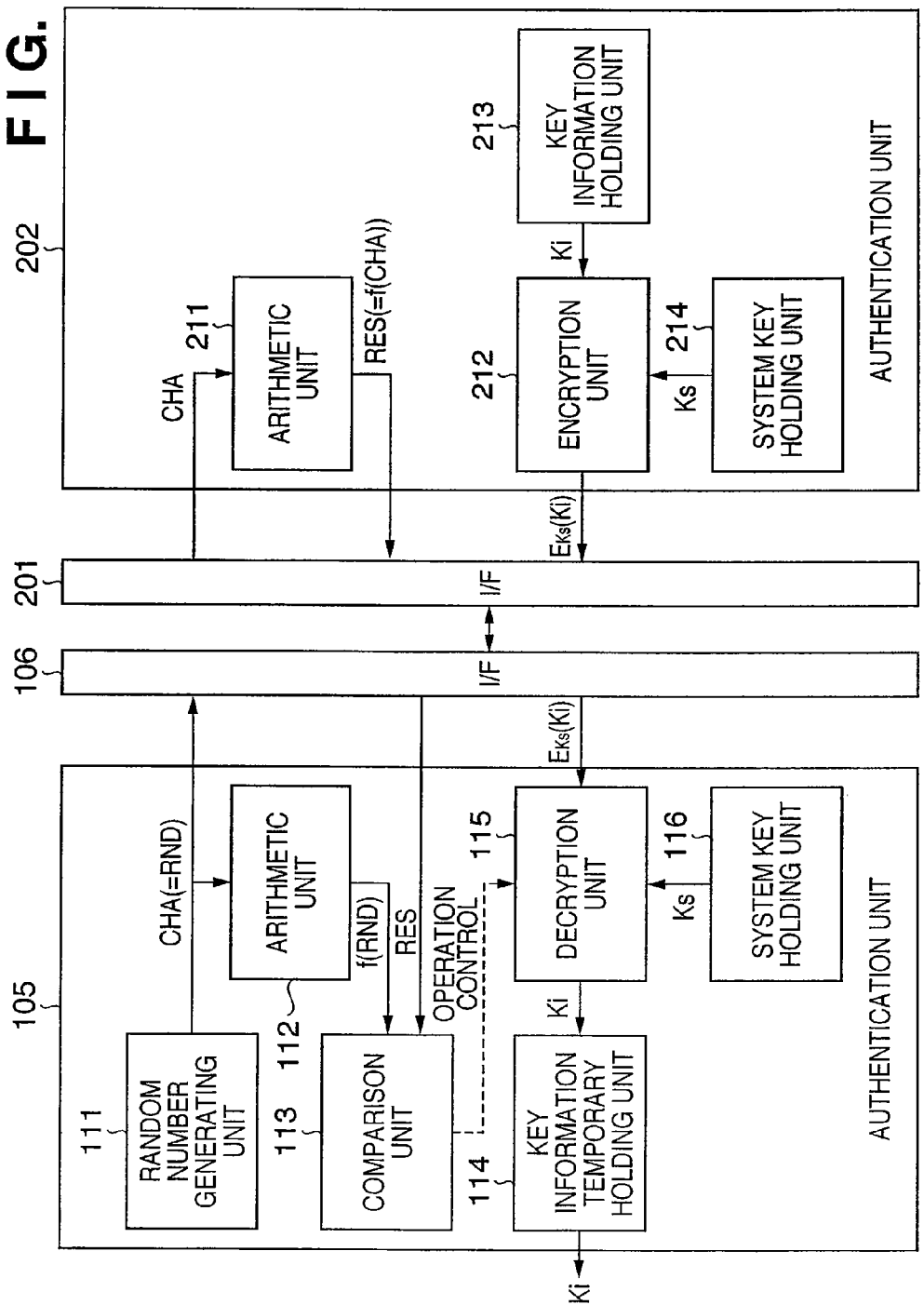
FIG. 2 is a block diagram showing arrangement of authentication units.

FIG. 2 is a block diagram showing an arrangement of the authentication units 105 and 202 shown in FIG. 1.

A random number generating unit 111 of the authentication unit 105 generates a random number RND, and temporarily holds it inside the random number generating unit 111. Also, the random number generating unit 111 transmits the random number RND as challenge data CHA to the authentication unit 202 via the I/F 106.

An arithmetic unit 112 generates verification data f(RND) from the random number RND temporarily held by the random number generating unit 111. The function f( ) to generate verification data is a function shared with an arithmetic unit 211 in secret, and can generate specific output data from input data to authenticate a partner. For example, the function f( ) can be implemented by a MAC (Message Authentication Code) or an encryption function using the system key Ks shared between the image input apparatus 10 and the information holding device 20.

A comparison unit 113 verifies the validity of the information holding device 20. More specifically, the comparison unit 113 compares response data RES received from the authentication unit 202 with verification data f(RND) generated by the arithmetic unit 112. When these data coincide with each other, the comparison unit 113 determines that the validity of the information holding device 20 is verified successfully, and operates a decryption unit 115. If RES and f(RND) do not coincide with each other, the comparison unit 113 determines that verification of the validity of the information holding device 20 fails, and does not operate the decryption unit 115.

The decryption unit 115 decrypts encrypted key information $E_{Ks}(Ki)$ received from the authentication unit 202, obtaining key information Ki used to encrypt image data. The key used for decryption is the system key Ks held by a system key holding unit 116. The cryptographic algorithm can employ various common-key cryptographic models such as AES in correspondence with the cryptographic algorithm adopted by an encryption unit 212 of the authentication unit 202. The decryption unit 115 can also verify integrity when key information contains information (e.g., checksum or hash value) for verifying integrity.

A key information temporary holding unit 114 temporarily holds key information Ki obtained by the decryption unit 115. The system key holding unit 116 holds the system key Ks shared between the image input apparatus 10 and the information holding device 20. Needless to say, the system key Ks must be held with confidentiality and integrity. The system key Ks is key information of a format which depends on the cryptographic algorithms of the encryption unit 212 and decryption unit 115. For example, when the cryptographic algorithm is AES, the system key Ks is 128-bit key information.

The arithmetic unit 211 of the authentication unit 202 receives challenge data CHA from the authentication unit 105 via the I/F 201. The arithmetic unit 211 generates response data RES (=f(CHA)), and transmits it to the authentication unit 105 via the I/F 201. The function f( ) to generate response data is identical to the function f( ) used by the arithmetic unit 112 to generate verification data.

A key information holding unit 213 holds key information Ki used to encrypt image data. Needless to say, the key information Ki must be held with confidentiality and integrity. The key information holding unit 213 can verify the integrity of key information by setting a checksum or hash value in the key information.

The encryption unit 212 encrypts the key information Ki held by the key information holding unit 213. The key used for encryption is the system key Ks held by a system key holding unit 214. The cryptographic algorithm corresponds to that used by the decryption unit 115 of the authentication unit 105.

Similar to the system key holding unit 116, the system key holding unit 214 holds the system key Ks shared between the image input apparatus 10 and the information holding device 20. The encryption unit 212 can be omitted by configuring the system key holding unit 214 to hold encrypted key information $E_{Ks}(Ki)$.

[Device Authentication]

Figure 3:
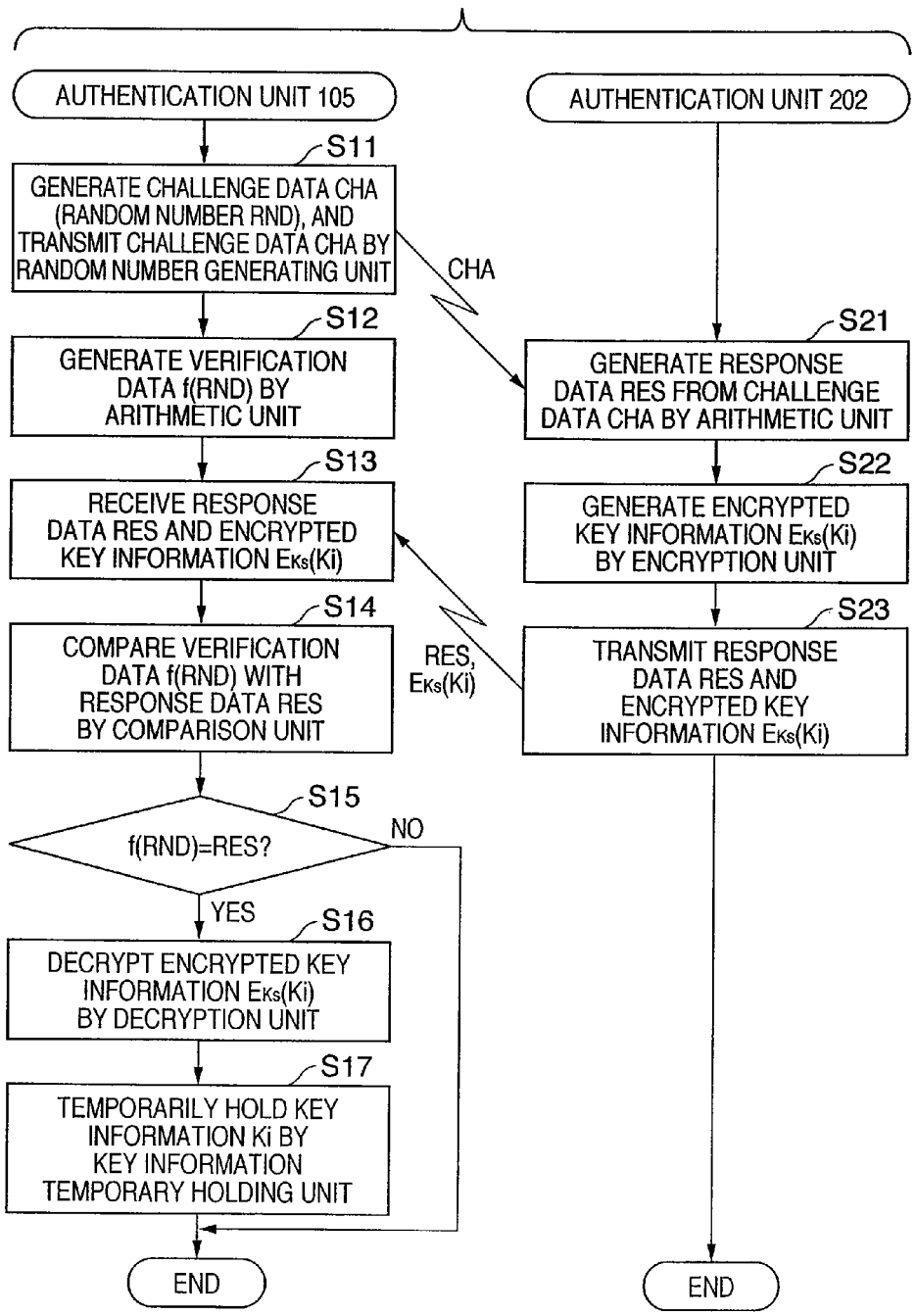
FIG. 3 is a flowchart showing device authentication processing executed by the authentication units.

FIG. 3 is a flowchart showing device authentication processing executed by the authentication units 105 and 202.

In the authentication unit 105, the random number generating unit 111 generates a random number RND as challenge data CHA, and transmits it to the arithmetic unit 112 and authentication unit 202 (S11). The arithmetic unit 112 generates verification data f(RND) from the received random number RND (S12).

In the authentication unit 202, the arithmetic unit 211 generates response data RES from the challenge data CHA received from the authentication unit 105 (S21). The encryption unit 212 encrypts key information Ki held by the key information holding unit 213 using the system key Ks held by the system key holding unit 214 as a key (S22). The authentication unit 202 transmits the response data RES generated in step S21 and the encrypted key information $E_{Ks}(Ki)$ generated in step S22 to the authentication unit 105 (S23).

The authentication unit 105 receives the response data RES and encrypted key information $E_{Ks}(Ki)$ (S13). Then, the comparison unit 113 compares the verification data f(RND) generated in step S12 with the received response data RES (S14). If these data do not coincide with each other, the processing ends.

If the verification data f(RND) and response data RES coincide with each other (YES in S15), i.e., verification is successful, the decryption unit 115 decrypts the received encrypted key information $E_{Ks}(Ki)$ using the system key Ks held by the system key holding unit 116 as a key (S16). The key information temporary holding unit 114 temporarily holds the key information Ki obtained by decryption (S17).

When the key information holding unit 213 holds the encrypted key information $E_{Ks}(Ki)$, step S22 can be skipped.

[Image Input]

Figure 4:
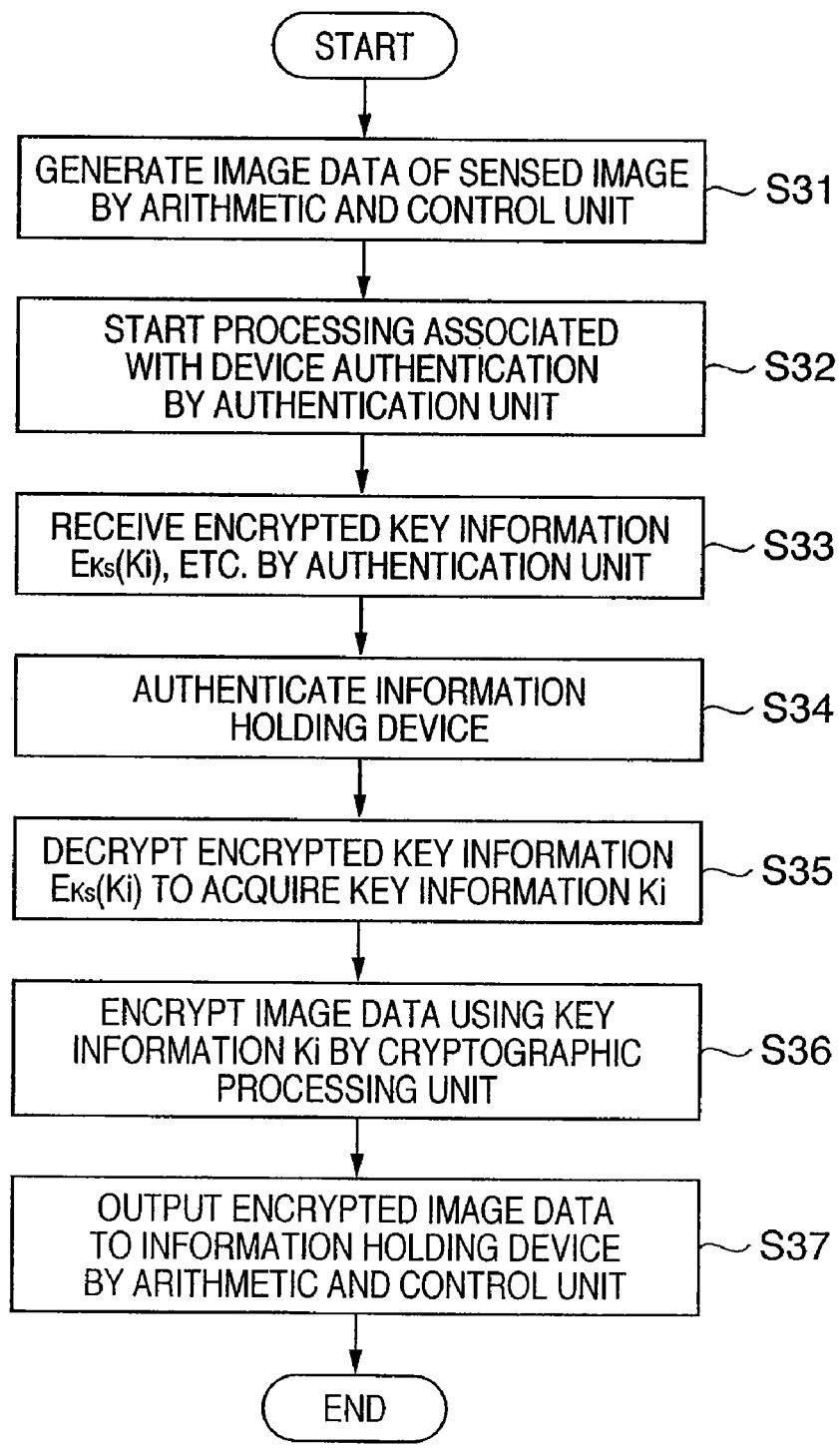
FIG. 4 is a flowchart showing encryption processing of an input image.

Encryption when the image input apparatus 10 inputs an image will be explained. FIG. 4 is a flowchart showing encryption processing of an input image.

When the user of the image input apparatus 10 presses the shutter button on the operation unit 104 (or may operate the shutter via a PC by remote control), the arithmetic and control unit 108 controls the image sensor 101 or the like, and executes image processing to generate image data (S31). The RAM 109 stores the image data.

The authentication unit 105 starts processing associated with the above-described device authentication (S32), and receives encrypted key information $E_{Ks}(Ki)$ or the like from the authentication unit 202 (S33). If the authentication unit 105 authenticates the information holding device 20 successfully (S34), it decrypts the encrypted key information $E_{Ks}(Ki)$ to acquire key information Ki (S35).

The cryptographic processing unit 107 encrypts the image data stored in the RAM 109 using the key information Ki held by the authentication unit 105 (S36). If device authentication fails and the authentication unit 105 does not hold any key information, the cryptographic processing unit 107 does not execute any encryption. The RAM 109 stores the encrypted image data.

The arithmetic and control unit 108 outputs the encrypted image data stored in the RAM 109 to the information holding device 20 via the I/F 106 (S37). Upon receiving the encrypted image data from the image input apparatus 10, the control unit 204 of the information holding device 20 stores the data in the recording unit 203. If the cryptographic processing unit 107 fails in encryption because, for example, the authentication unit 105 does not hold key information, the arithmetic and control unit 108 may output unencrypted image data or may not output image data. Which of the two processes is employed depends on the control policy or security policy of the image input apparatus 10.

The processing in FIG. 4 executes device authentication every shutter button operation (image input instruction). As described above, the key information holding period can be set variously to, e.g., the period when the information holding device 20 is connected to (or mounted in) the image input apparatus 10. For example, when the information holding device 20 is connected to the image input apparatus 10, the authentication unit 105 executes device authentication and holds key information. The authentication unit 105 keeps holding the key information until the information holding device 20 is disconnected (or dismounted) from the image input apparatus 10. The authentication unit 105, which holds key information, does not perform device authentication every image input instruction. The authentication unit 105 may execute authentication when the image input apparatus 10 is turned on while the information holding device 20 is mounted in the image input apparatus 10, rather than when the information holding device 20 is connected or mounted.

Similarly, the authentication unit 105 may keep holding key information until the image input apparatus 10 is turned off, rather than disconnected (or dismounted) from the information holding device 20. In other words, the key information can be held by the authentication unit 105 while the image input apparatus 10 is power on.

In the above example, the recording unit 203 of the information holding device 20 stores encrypted image data. However, no set of encrypted image data and key information Ki need be saved. Hence, various memory cards, in addition to the information holding device 20, are available as the encrypted image data output destination. However, the information holding device 20 holding the key information Ki is indispensable for using encrypted image data.

The above description is related to encryption of image data sensed by the image sensor 101. However, the present invention is not limited to image data sensed by the image sensor 101, and is also applicable to, e.g., image data input as a data file from another device. Device authentication and the key acquisition method according to the present invention are not limited to encryption, and are also applicable to decryption, MAC generation, and the like.

In this manner, the first embodiment pays attention to the fact that processing after device authentication is transmission of key information from the information holding device 20 to the image input apparatus 10. The first embodiment simultaneously implements mutual authentication and transfer of key information by using the challenge-response authentication method for authentication of the information holding device 20 by the image input apparatus 10, and the message authentication method for authentication of the image input apparatus 10 by the information holding device 20. The message authentication method is a method of encrypting key information with the shared system key Ks and transmitting the encrypted key information.

Further, message exchange of the challenge-response authentication method contains a message of the message authentication method. Accordingly, the first embodiment can prevent the replay attack, and implement mutual authentication by two-pass message exchange.

More specifically, in device authentication according to the first embodiment, the image input apparatus 10 authenticates the information holding device 20 (one way authentication) according to the challenge-response method before processing. Then, the information holding device 20 supplies the key Ki used for encryption to the image input apparatus 10 by the message authentication method. In other words, the key is shared at this point. Hence, only the authentic information holding device 20 can use (decrypt) processed data (encrypted image data). In this way, authentication (mutual authentication) of the image input apparatus 10 is implemented.

In general, an efficient mutual authentication method must resist the same threat, so two equipments must execute the same authentication method. In a mutual authentication method that is a simple combination of different authentication methods, the difference between their features may lead to vulnerability. However, the first embodiment specializes in processing after authentication, enabling the combination of different authentication methods. By concatenating messages transmitted by different authentication methods, the first embodiment can prevent the replay attack, which is a problem in the message authentication method, and can reduce the number of message exchange processes, which is a problem in the challenge-response authentication method.

Second Embodiment

Information processing according to the second embodiment of the present invention will be described. In the second embodiment, the same reference numerals as those in the first embodiment denote the same components, and a detailed description thereof will not be repeated.

In the authentication procedures of the first embodiment, data transmitted from the authentication unit 202 to the authentication unit 105 are response data RES and encrypted key information $E_{Ks}(Ki)$. The data changes as a whole every authentication. The response data RES changes every authentication depending on challenge data CHA which is a random number. However, encrypted key information generated from key information Ki having a fixed value and system key information Ks takes a fixed value. The second embodiment pays attention to this fact, and will explain a method of not setting encrypted key information as a fixed value.

[Arrangement for Device Authentication]

Figure 5:
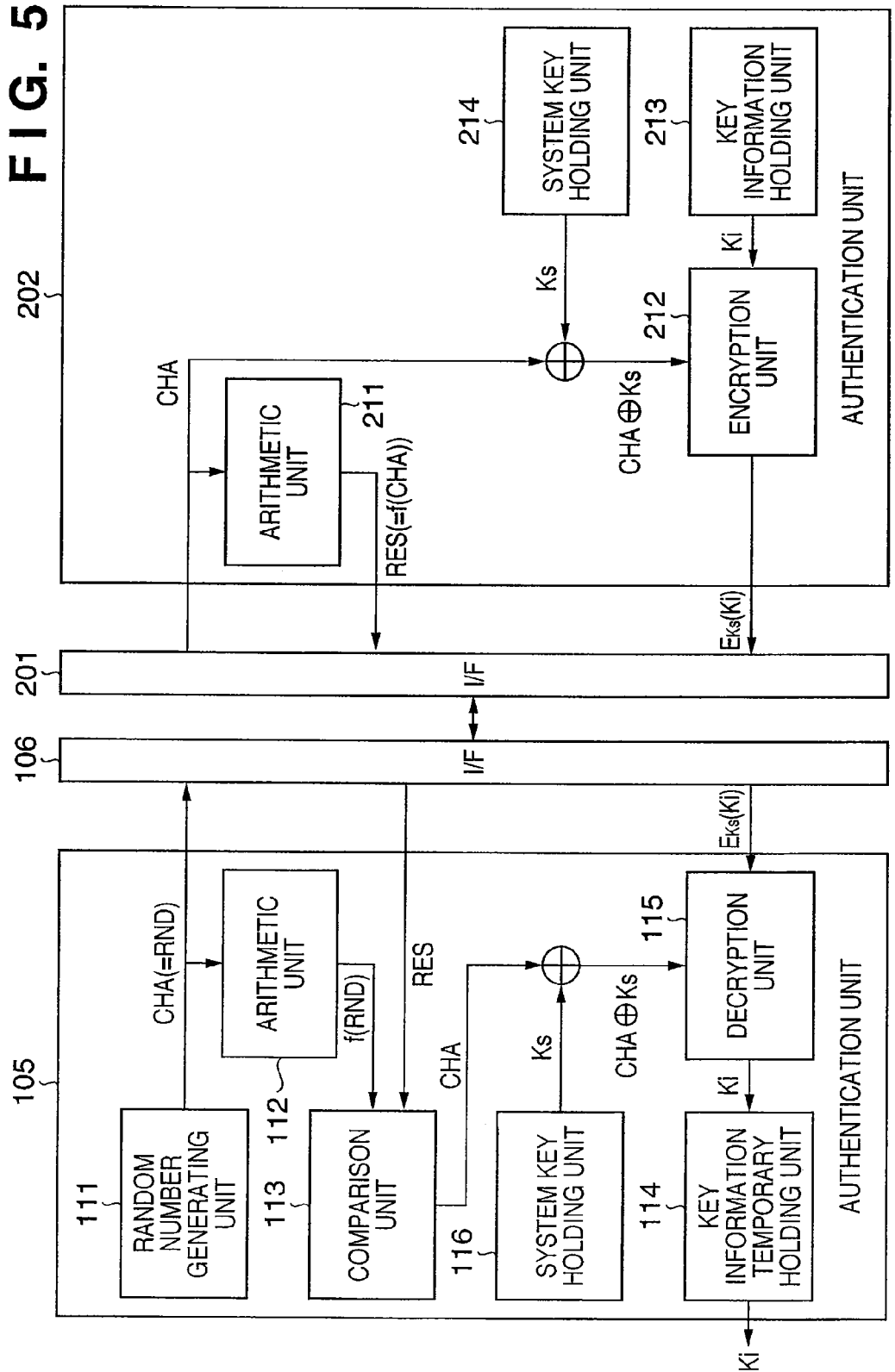
FIG. 5 is a block diagram showing arrangement of authentication units in the second embodiment.

FIG. 5 is a block diagram showing an example of the arrangement of authentication units 105 and 202 in the second embodiment.

An encryption unit 212 of the authentication unit 202 generates encrypted information $E_{Ks}(Ki)$ using, as a key, data obtained by exclusive-ORing challenge data CHA and the system key Ks held by a system key holding unit 214. A decryption unit 115 of the authentication unit 105 decrypts the encrypted information $E_{Ks}(Ki)$ using, as a key, data obtained by exclusive-ORing challenge data CHA and the system key Ks held by a system key holding unit 116.

Methods of generating keys for use by the decryption unit 115 and encryption unit 212 must be paired methods to obtain the same key by the decryption unit 115 and encryption unit 212. However, other methods are also available as long as the same key is obtained. According to the above-mentioned methods, the system key Ks and challenge data CHA are exclusive-ORed to generate a key. However, various two-input functions are available, including a method of ANDing data and a method of concatenating data to obtain a hash value.

The key may be generated not only by using the system key Ks and challenge data CHA, but also by using the system key Ks and response data RES, or using three data inputs, i.e., the system key Ks, challenge data CHA, and response data RES. Especially in the use of the response data RES, the response data RES is affected by an output from a random number generating unit 111 of the authentication unit 105 and an output from an arithmetic unit 211 of the authentication unit 202. This can prevent fixing of a key which alters one device.

As described above, the second embodiment can obtain the same effects as those of the first embodiment. In addition, since encrypted key information transmitted from the authentication unit 202 to the authentication unit 105 changes to different data every authentication, the second embodiment can prevent the replay attack more reliably than the first embodiment.

Third Embodiment

Information processing according to the third embodiment of the present invention will be described. In the third embodiment, the same reference numerals as those in the first and second embodiments denote the same components, and a detailed description thereof will not be repeated.

The first and second embodiments have described a system which performs device authentication between the image input apparatus 10 and the information holding device 20. This system is not applicable to only an image input apparatus which generates image data. The third embodiment will describe an example application of the system to an image viewing apparatus using image data.

[Configuration of Authentication System]

Figure 6:
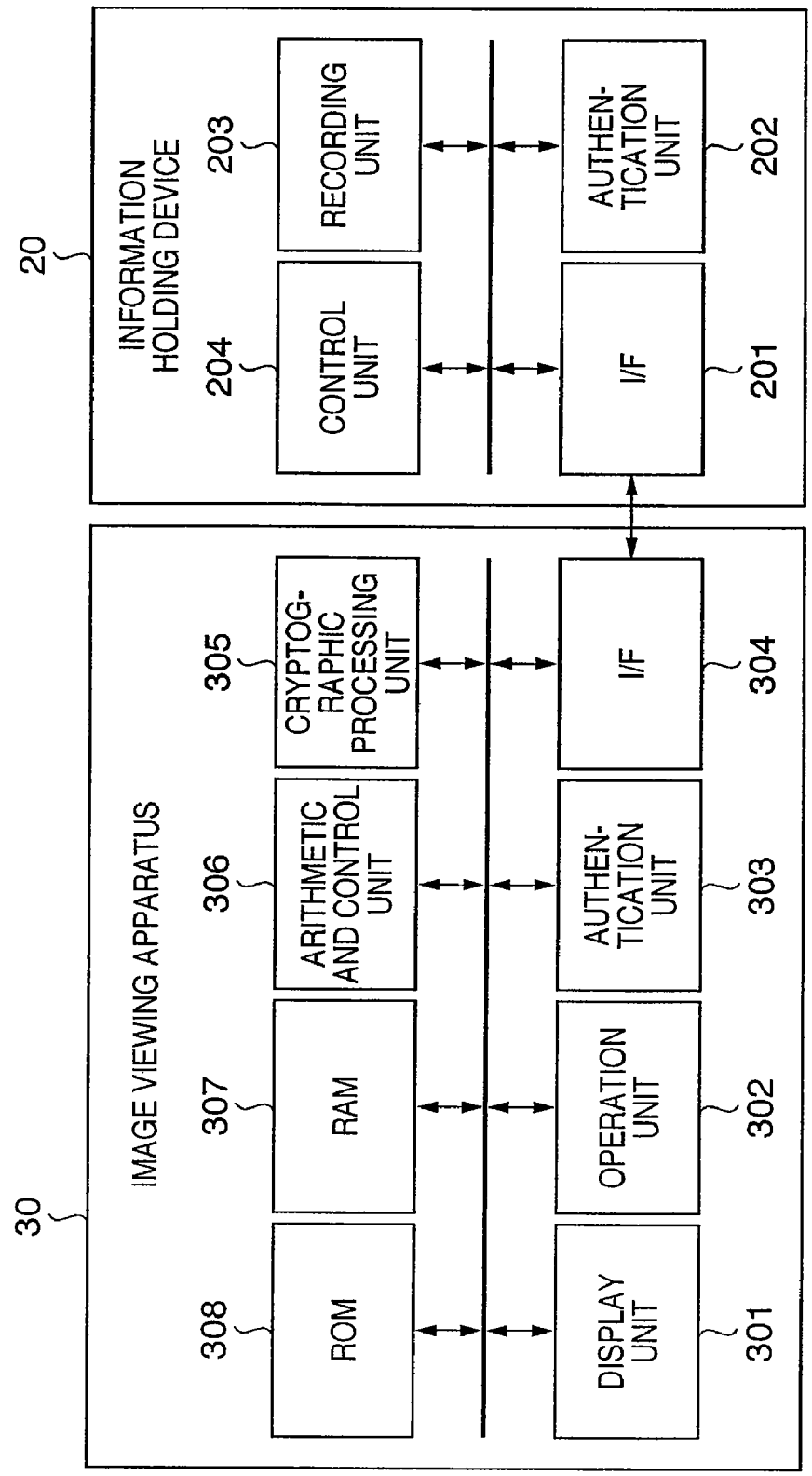
FIG. 6 is a block diagram showing arrangement of an image processing apparatus having a device authentication function in the third embodiment.

FIG. 6 is a block diagram showing an arrangement of an image processing apparatus having a device authentication function.

The image processing apparatus comprises an information holding device 20 and an image viewing apparatus 30 such as a PC. In implementing the image processing apparatus, not all building components shown in FIG. 6 need be used. Images which can be viewed (reproduced) in the image viewing apparatus 30 are not limited to still images, and also include moving images.

Image Viewing Apparatus

In the image viewing apparatus 30, an arithmetic and control unit 306 uses a RAM 307 as a work memory, and executes programs stored in a ROM 308 to control respective units of the image viewing apparatus 30.

A cryptographic processing unit 305 decrypts encrypted image data using key information held by an authentication unit 303 as a decryption key. The cryptographic algorithm can employ various common-key cryptographic models such as AES.

The authentication unit 303 authenticates the validity of the information holding device 20. Similar to the first embodiment, when the authentication unit 303 authenticates the information holding device 20, it decrypts encrypted key information received from the information holding device 20, and temporarily holds the decrypted key information.

With this configuration, the cryptographic processing unit 305 decrypts encrypted image data loaded from a recording unit 203 of the information holding device 20, and stores it in the RAM 307. The arithmetic and control unit 306 performs necessary image processing (decompression processing of compressed data, video signal processing, and the like) for the image data stored in the RAM 307, and displays the reproduced image data on a display unit 301. The user of the image viewing apparatus 30 operates an operation unit 302 to input various instructions such as an image to be displayed and the display method.

In the first and second embodiments, data to be processed is image data input from the image sensor 101, and the operation of the cryptographic processing unit 107 is encryption. To the contrary, in the third embodiment, data to be processed is encrypted image data input from the information holding device 20, and the operation of the cryptographic processing unit 305 is decryption. However, device authentication, the method of acquiring an encryption or decryption key, and the like are the same.

The third embodiment can simultaneously implement device authentication and key transfer in the image viewing apparatus, similar to the first and second embodiments. The third embodiment can prevent the replay attack, and implement message exchange by two passes.

Exemplary Embodiments

The present invention can be applied to a system constituted of a plurality of devices (e.g., host computer, interface, reader, printer) or to an apparatus comprising a single device (e.g., copying machine, facsimile machine).

This invention can be applied to challenge-response method rather than the three-pass authentication method (ISO/IEC9798-2).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments that can be realized by executing the program code that is read by a computer, the present invention includes a case where an OS (operating system) or the like working on the computer performs at least a part of processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs at least a part of processes in accordance with designations of the program code and realizes functions of the above embodiments.

In the case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-159144, filed Jun. 7, 2006, which is hereby incorporated by reference herein in its entirety.

What is claimed is:

1. A data transmission apparatus comprising:
   an input section, arranged to input image data to be stored in a data reception apparatus;
   a transmitter, arranged to transmit data to the data reception apparatus;
   a receiver, arranged to receive, response data with encrypted key information generated from key information held in the data reception apparatus as a response of the data reception apparatus to challenge data transmitted by the transmitter when the input section inputs the image data;
   an authentication section, arranged to authenticate the data reception apparatus based on the challenge data and the response data;
   a decryption section, arranged to decrypt, in the case that the authentication is successful, the encrypted key information to acquire the key information; and
   an encryption section, arranged to encrypt the input image data using the key information decrypted by the decryption section to transmit the encrypted image data by the transmitter;
   wherein the data reception apparatus receives the encrypted image data from the data transmission apparatus, and stores the received encrypted image data in a memory.

2. An apparatus according to claim 1, further comprising a holding section arranged to hold the decrypted key information for a predetermined period.

3. An apparatus according to claim 1, wherein the challenge data is a random number, and the response data is obtained by encrypting the random number.

4. A data reception apparatus comprising:
   a receiver, arranged to receive data from a data transmission apparatus;
   a generator, arranged to generate response data from challenge data received by the receiver;
   an encryption section, arranged to encrypt key information stored in a memory;
   a transmitter, arranged to transmit the response data with the encrypted key information to the data transmission apparatus as a response to the challenge data; and
   a controller, arranged to store image data received by the receiver in another memory,
   wherein the data transmission apparatus authenticates the data reception apparatus based on the challenge data and the response data,
   wherein, in the case that the authentication is successful, the data transmission apparatus decrypts the encrypted key information to acquire the key information, encrypts image data to be stored in the data reception apparatus using the key information, and transmits the encrypted image data to the data reception apparatus.

5. A method of a data transmission apparatus comprising the steps of:
   transmitting challenge data to a data reception apparatus when image data is inputted;
   receiving response data with encrypted key information generated from key information held in the data reception apparatus as a response of the data reception apparatus to the challenge data;
   authenticating the data reception apparatus based on the challenge data and the response data;
   decrypting, in the case that the authentication is successful, the encrypted key information to acquire the key information;
   encrypting the image data using the key information decrypted in the decrypting step; and
   transmitting the encrypted image data to the data reception apparatus
   wherein the data reception apparatus receives the encrypted image data from the data transmission apparatus, and stores the received encrypted image data in a memory.

6. A method of a data reception apparatus comprising the steps of:
   receiving challenge data from a data transmission apparatus;
   generating response data from the challenge data;
   encrypting key information stored in a memory;
   transmitting the response data with the encrypted key information to the data transmission apparatus; and
   storing image data received from the data transmission apparatus in another memory,
   wherein the data transmission apparatus authenticates the data reception apparatus based on the challenge data and the response data,
   wherein, in the case that the authentication is successful, the data transmission apparatus decrypts the encrypted key information to acquire the key information, encrypts image data to be stored in the data reception apparatus using the key information, and transmits the encrypted image data to the data reception apparatus.

7. A computer-executable program storing a non-transitory computer-readable medium, and causing a computer to perform a method of the data transmission apparatus, the method comprising the steps of:
   transmitting challenge data to a data reception apparatus when image data is inputted;
   receiving response data with encrypted key information generated from key information held in the data reception apparatus as a response of the data reception apparatus to the challenge data;
   authenticating the data reception apparatus based on the challenge data and the response data;
   decrypting, in the case that the authentication is successful, the encrypted key information to acquire the key information;
   encrypting the image data using the key information decrypted in the decrypting step; and
   transmitting the encrypted image data to the data reception apparatus,
   wherein the data reception apparatus receives the encrypted image data from the data transmission apparatus, and stores the received encrypted image data in a memory.

8. A computer-executable program storing a non-transitory computer-readable medium, and causing a computer to perform a method of the data reception apparatus, the method comprising the steps of:
   receiving challenge data from a data transmission apparatus;
   generating response data from the challenge data;
   encrypting key information stored in a memory;
   transmitting the response data with the encrypted key information to the data transmission apparatus; and
   storing image data received from the data transmission apparatus in another memory,
   wherein the data transmission apparatus authenticates the data reception apparatus based on the challenge data and the response data,
   wherein, in the case that the authentication is successful, the data transmission apparatus decrypts the encrypted key information to acquire the key information, encrypts image data to be stored in the data reception apparatus using the key information, and transmits the encrypted image data to the data reception apparatus.

9. A non-transitory computer-readable medium storing a computer-executable program causing a computer to perform a method of a data transmission apparatus, the method comprising the steps of:
   transmitting challenge data to a data reception apparatus when image data is inputted;
   receiving response data with encrypted key information generated from key information held in the data reception apparatus as a response of the data reception apparatus to the challenge data;
   authenticating the data reception apparatus based on the challenge data and the response data;
   decrypting, in the case that the authentication is successful, the encrypted key information to acquire the key information;
   encrypting the image data using the key information decrypted in the decrypting step; and
   transmitting the encrypted image data to the data reception apparatus,
   wherein the data reception apparatus receives the encrypted image data from the data transmission apparatus, and stores the received encrypted image data in a memory.

10. A non-transitory computer-readable medium storing a computer-executable program causing a computer to perform a method of a data reception apparatus, the method comprising the steps of:
    receiving challenge data from a data transmission apparatus;
    generating response data from the challenge data;
    encrypting key information stored in a memory;
    transmitting the response data with the encrypted key information to the data transmission apparatus; and
    storing image data received from the data transmission apparatus in another memory,
    wherein the data transmission apparatus authenticates the data reception apparatus based on the challenge data and the response data,
    wherein, in the case that the authentication is successful, the data transmission apparatus decrypts the encrypted key information to acquire the key information, encrypts image data to be stored in the data reception apparatus using the key information, and transmits the encrypted image data to the data reception apparatus.

* * * * *